US010265815B2

(12) United States Patent
Copeland

(10) Patent No.: US 10,265,815 B2
(45) Date of Patent: Apr. 23, 2019

(54) ENGINE BLOCK BEARING CAP REMOVAL MECHANISM

(71) Applicant: Toyota Motor Engineering & Manufacturing North America, Inc., Erlanger, KY (US)

(72) Inventor: Kevin W. Copeland, Madison, AL (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 138 days.

(21) Appl. No.: 15/239,079

(22) Filed: Aug. 17, 2016

(65) Prior Publication Data

US 2018/0050428 A1     Feb. 22, 2018

(51) Int. Cl.
*F02F 7/00* (2006.01)
*B23P 19/027* (2006.01)

(52) U.S. Cl.
CPC .......... *B23P 19/027* (2013.01); *F02F 7/0053* (2013.01); *B23P 2700/50* (2013.01)

(58) Field of Classification Search
CPC .. B23P 19/027; B23P 19/042; B25B 27/0028; B25B 27/0035; B25B 27/02; B25B 27/026; B25B 27/06; B25B 27/064
See application file for complete search history.

(56) References Cited

U.S. PATENT DOCUMENTS

| | | | | |
|---|---|---|---|---|
| 1,426,835 A | * | 8/1922 | Mohrman | B25B 27/023 29/259 |
| 3,285,104 A | * | 11/1966 | Baumann | B65B 7/2821 101/4 |
| 3,885,290 A | * | 5/1975 | Bouquet | B23P 19/042 29/252 |
| 3,908,258 A | * | 9/1975 | Barty | B23P 19/025 29/252 |
| 4,145,799 A | * | 3/1979 | Fehr | F16C 9/02 29/252 |
| 4,305,194 A | * | 12/1981 | Keener | B25B 27/26 29/251 |

(Continued)

FOREIGN PATENT DOCUMENTS

CN         201483208 U     5/2010

OTHER PUBLICATIONS

Freedom Racing Tool and Auto, LLC, Retrieved from the Internet: <http://www.freedomracing.com/crankshaft-bearing-cap-remover-j-4818-u.html>, Retrieved Apr. 28, 2016, 4 pages.

*Primary Examiner* — Tyrone V Hall, Jr.
(74) *Attorney, Agent, or Firm* — Christopher G. Darrow; Darrow Mustafa PC

(57) ABSTRACT

A bearing cap removal mechanism is structured for removing bearing caps from an engine block. The bearing cap removal mechanism includes a securement mechanism operable to releasably secure at least one bearing cap to the securement mechanism prior to removal of the at least one bearing cap from the engine block. A removal force application mechanism is operatively coupled to the securement mechanism. The removal force application mechanism is operable to move the securement mechanism in a direction away from the engine block when the at least one bearing cap is secured to the securement mechanism, thereby removing the at least one bearing cap from the engine block.

22 Claims, 7 Drawing Sheets

(56) References Cited

U.S. PATENT DOCUMENTS

| | | | |
|---|---|---|---|
| 4,589,179 A | | 5/1986 | Hulting, Jr. |
| 4,850,102 A | * | 7/1989 | Hironaka .............. B23P 19/001 29/33 K |
| 4,887,341 A | * | 12/1989 | Sakimori .............. B23P 19/006 29/430 |
| 4,951,386 A | * | 8/1990 | Itano .................... B23P 19/042 29/783 |
| 5,189,785 A | * | 3/1993 | Inoguchi et al. ..... B23P 19/042 29/240 |
| 5,993,364 A | * | 11/1999 | Matsuura .............. B23P 19/042 29/795 |
| 2008/0189939 A1 | * | 8/2008 | Kraus ................. B23K 37/047 29/824 |

* cited by examiner

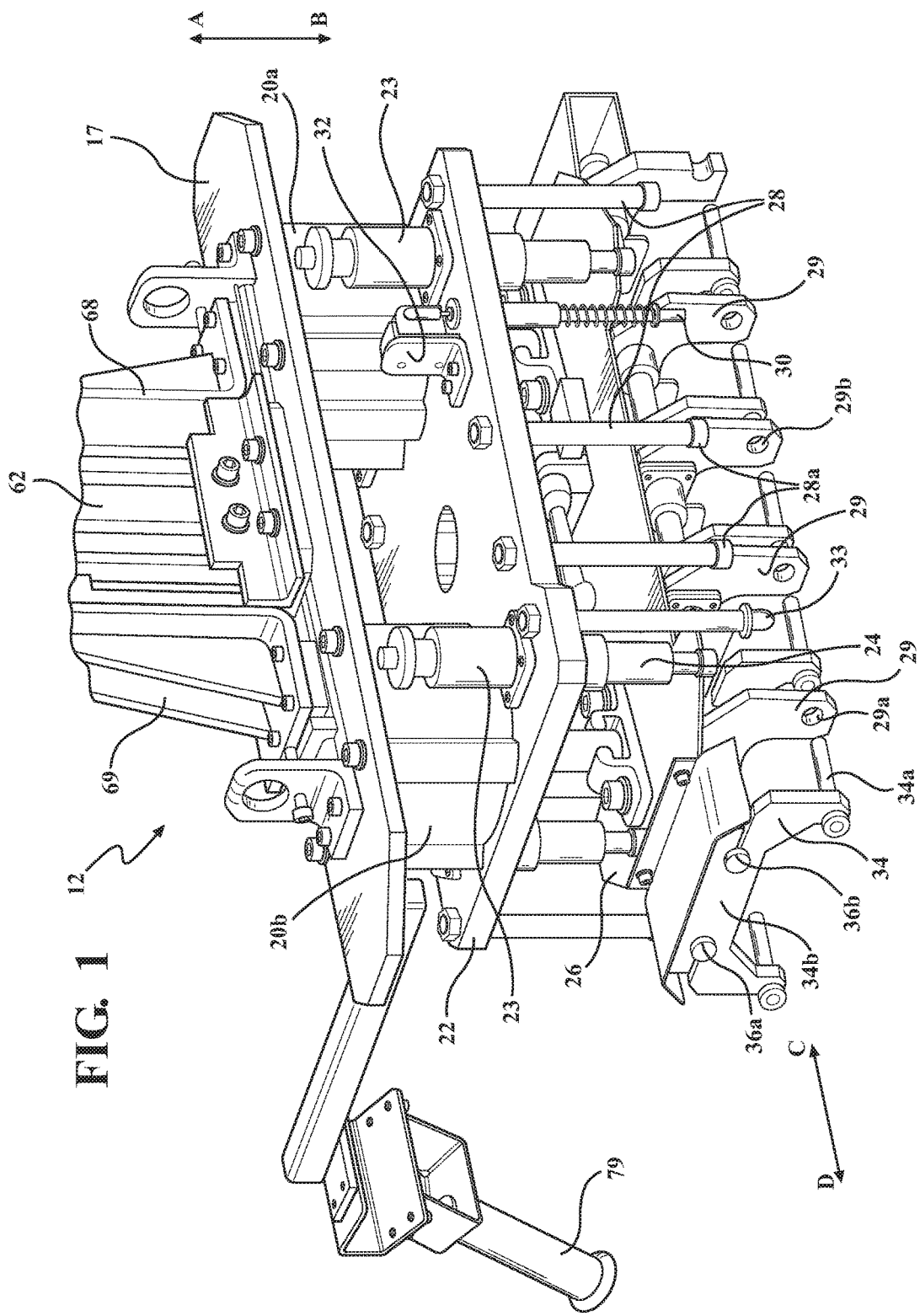

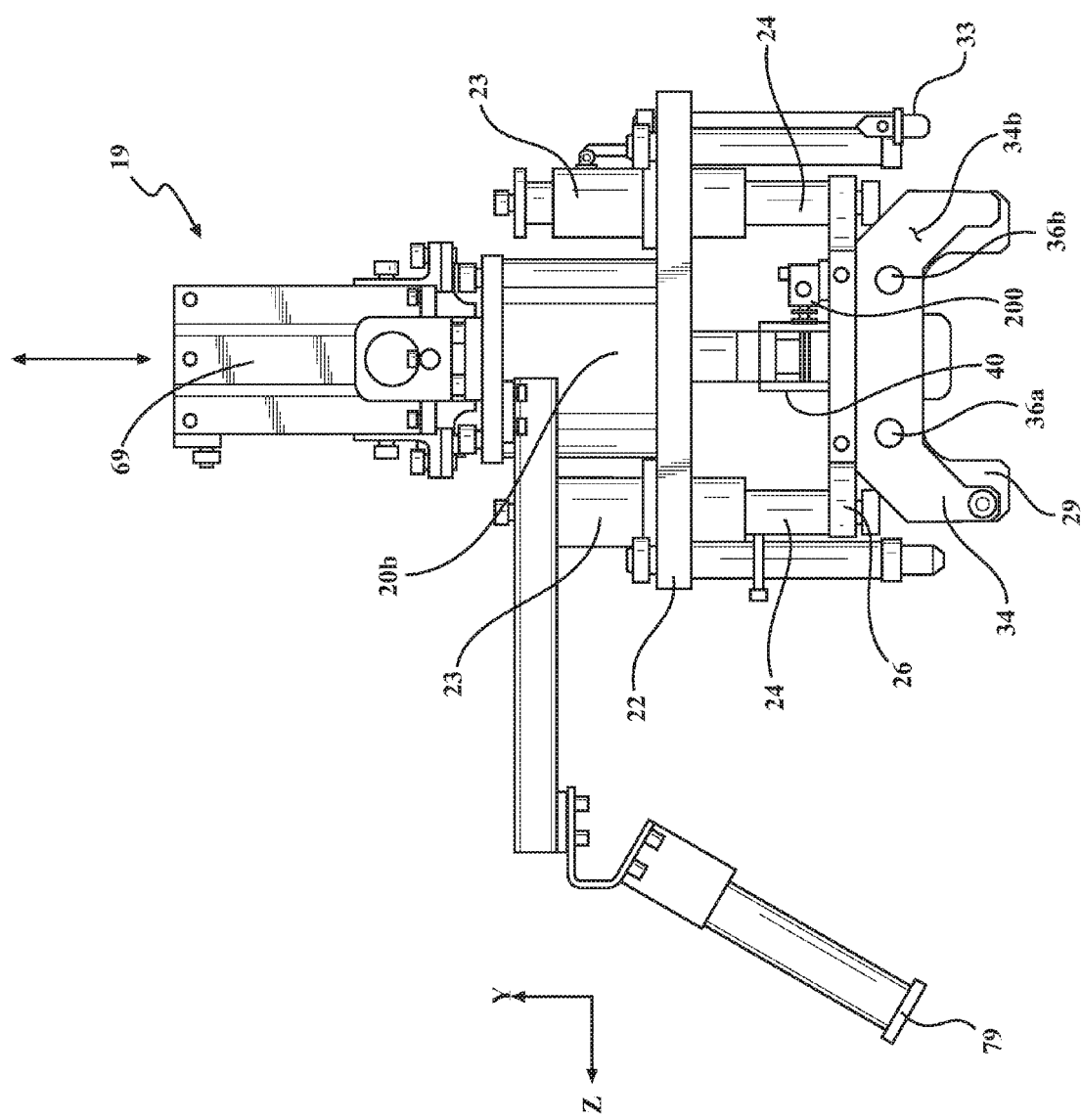

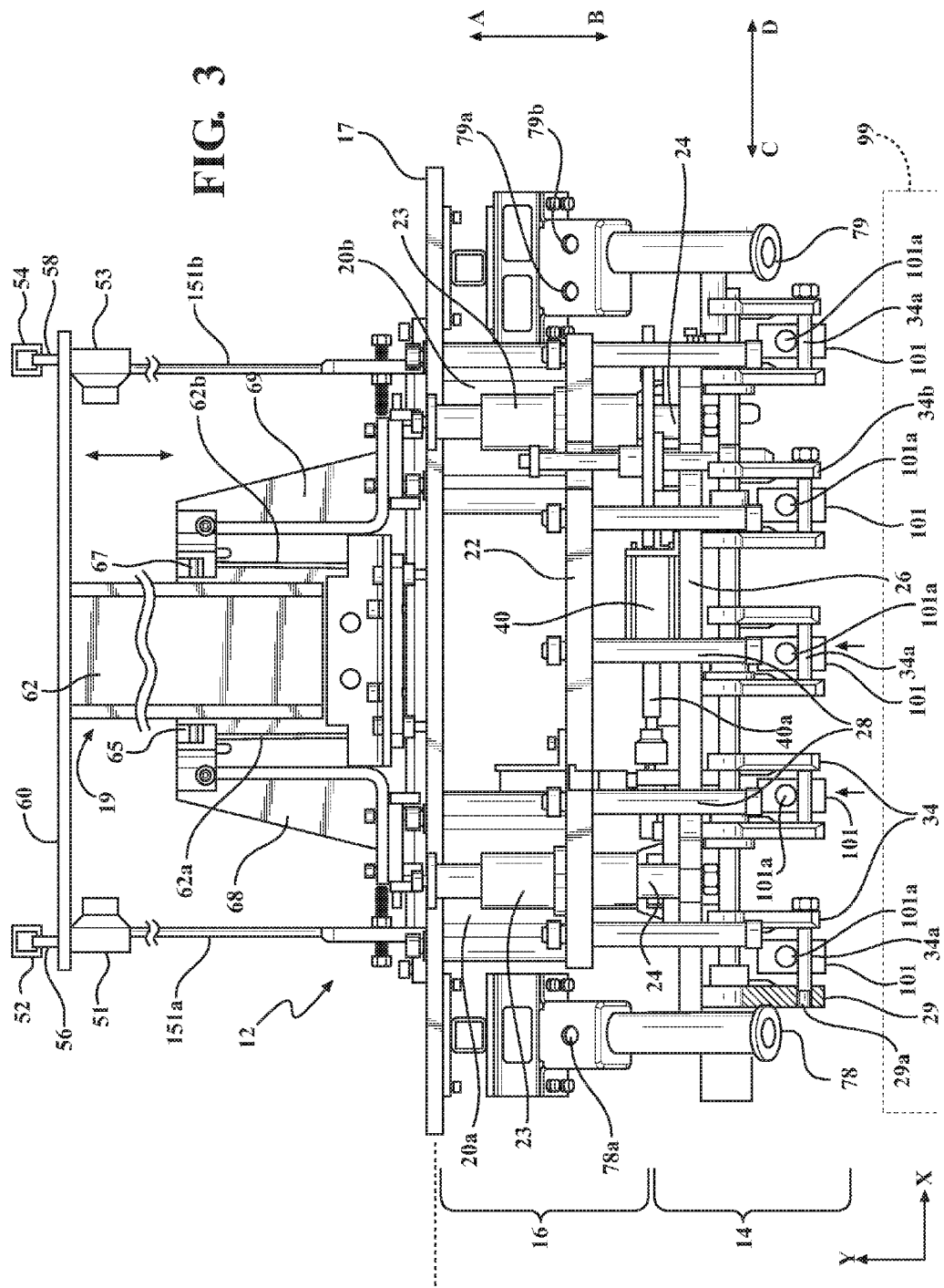

ENGINE BLOCK BEARING CAP REMOVAL MECHANISM

TECHNICAL FIELD

The present invention relates to tools and fixtures which aid in disassembly and/or repair of vehicle and vehicle components.

BACKGROUND

Vehicle engines may have bearings attached to the engine block for supporting a crankshaft. The bearings may have caps which are press-fit onto the engine block. During servicing and rework of vehicle engines, it may be necessary to remove the caps from the engine block. It may be difficult and time-consuming to manually remove the caps from the blocks. Also, since the caps are press-fit onto the block, it may be difficult to control the direction and magnitude of the cap removal forces if the forces are applied manually. If excessive force is exerted in the wrong direction, the block and/or the caps may be damaged.

SUMMARY

In one aspect of the embodiments described herein, a bearing cap removal mechanism structured for removing bearing caps from an engine block is provided. The cap removal mechanism includes a securement mechanism operable to releasably secure at least one bearing cap to the securement mechanism prior to removal of the at least one bearing cap from the engine block. A removal force application mechanism is operatively coupled to the securement mechanism. The removal force application mechanism is operable to move the securement mechanism in a direction away from the engine block when the at least one bearing cap is secured to the securement mechanism, thereby removing the at least one cap from the engine block.

In another aspect of the embodiments described herein, a bearing cap removal mechanism is structured for removing bearing caps from an engine block. The cap removal mechanism includes at least one securement member operable to releasably secure at least one associated bearing cap to the securement member prior to removal of the at least one bearing cap from the engine block. A removal force application mechanism is operatively coupled to the at least one securement member. The removal force application mechanism is operable to move the at least one securement member in a direction away from the engine block when the at least one bearing cap is secured to the at least one securement member, thereby removing the at least one cap from the engine block.

BRIEF DESCRIPTION OF THE DRAWINGS

FIG. 1 is a rear perspective view of a bearing cap removal mechanism in accordance with an embodiment described herein.

FIG. 1B is a side view of the embodiment shown in FIG. 1.

FIG. 3 is the frontal view of FIG. 2 after operation of the mechanism to remove the secured bearing caps from the engine block.

DETAILED DESCRIPTION

FIGS. 1-4 show various views of an embodiment of a bearing cap removal mechanism 12 structured for removing bearing caps from vehicle engine blocks. Components of the mechanism 12 may be formed from any materials suitable for their associated purposes, as described herein.

Figure 1A:
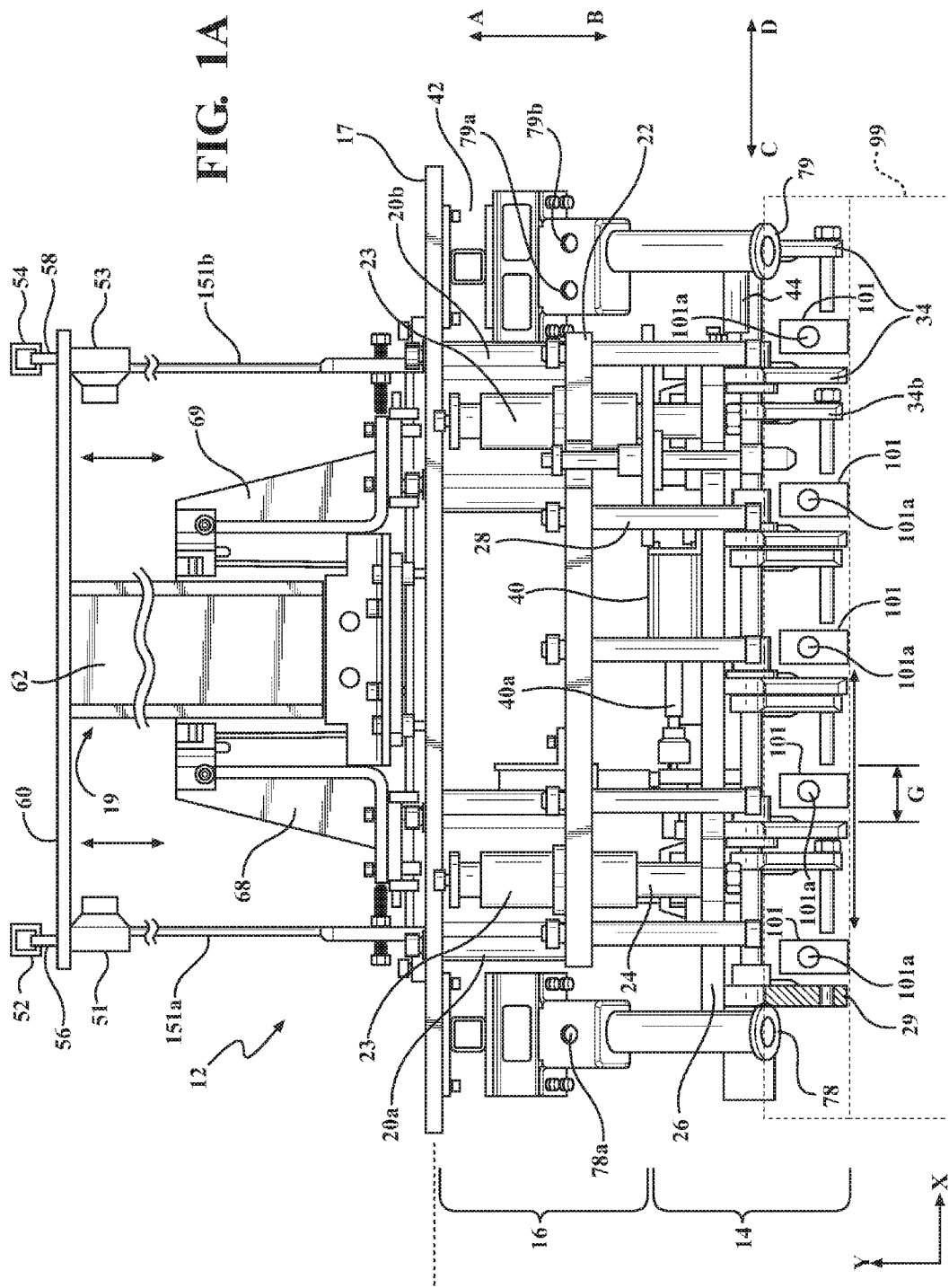
FIG. 1A is a frontal view of the bearing cap removal mechanism embodiment shown in FIG. 1, showing the mechanism positioned in contact with an engine block prior to operation of the mechanism to secure the engine block bearing caps to the mechanism for cap removal.

Referring to FIGS. 1 and 1A, in the embodiment shown, bearing cap removal mechanism 12 includes a securement mechanism (generally designated 14) operative to releasably secure one or more bearing caps 101 to the securement mechanism prior to removal of the one or more bearing caps from an engine block 99. The bearing cap removal mechanism 12 also includes a removal force application mechanism (generally designated 16) operatively coupled to the securement mechanism 14. The removal force application mechanism 16 is operative to move the securement mechanism 14 relative to the removal force application mechanism 16, in a direction away from the engine block 99 (for example, in direction "A" shown in FIG. 1A), thereby removing the one or more bearing caps 101 secured by the securement mechanism from the engine block 99.

In the embodiment shown, the removal force application mechanism 16 and the securement mechanism 14 may be supported by a suspended member 17, which may be suspended from a support mechanism 19 (FIG. 4, described in greater detail below) structured to support the removal force application mechanism 16, the securement mechanism 14, and the suspended member 17 for positioning by an operator of the bearing cap removal mechanism 12.

The removal force application mechanism 16 includes at least one actuator structured to apply the forces to the securement mechanism 14 required to move the securement mechanism 14 in a direction away from the engine block. The at least one actuator may include at least one cylinder, such as a pneumatic cylinder or hydraulic cylinder. In the embodiment shown, two actuators are provided in the form of pneumatic cylinders 20a and 20b attached to the suspended member 17 at first ends of the cylinders, so that piston rods (not shown) of the cylinders 20a and 20b have strokes which operate in direction "A" (toward the suspended member 17) and also in direction "B" (in a direction away from the suspended member 17). Cylinders 20a and 20b may be any suitable types of cylinders, for example, pneumatic cylinders or hydraulic cylinders. In other embodiments, other types of actuators may be used (for example, a motor configured to drive a shaft coupled to the motor along the shaft axis, using gears or a screw drive).

A guide mounting member 22 may be attached to the cylinders 20a and 20b at second ends of the cylinders 20a and 20b opposite the first ends of the cylinders, or the guide mounting member 22 may be otherwise coupled to the suspended member 17 so as to be positionally fixed with respect to the suspended member 17. Holes (not shown) are formed in the guide mounting member 22 coaxially with the piston shafts of the cylinders 20a and 20b, and enable piston shafts of cylinders 20a and 20b to extend through the guide mounting member 22 to the space between the guide mounting member 22 and the securement mechanism mounting member 26 (described below).

A plurality of slide bushings 23 may be attached to the guide mounting member 22 at various locations. Each slide bushings 23 may configured to receive and support therein an associated guide shaft 24 which extends through the guide mounting member 22 and is attached to the securement mechanism mounting member 26 (described below). Guide shafts 24 help to stabilize and restrict motion of the securement mechanism mounting member 26 to motion in directions "A" and "B" with respect to the guide mounting member 22.

A plurality of standoffs 28 may be mounted on the guide mounting member 22 so as to extend in a direction from the guide mounting member 22 generally toward the position in which an engine block 99 would reside during operation of the mechanism 12 to remove the bearing caps. Standoffs 28 aid in positioning the bearing cap removal mechanism 12 with respect to the engine block 99 prior to operation of the securement mechanism 14 to secure the bearing caps 101 thereto. Standoffs 28 may be dimensioned and positioned so that ends 28a of the standoffs rest on a surface of the engine block oil pan 57 (as shown in FIG. 2A) when the bearing cap removal mechanism 12 is in position to actuate the securement mechanism 14 to secure the bearing caps 101 for removal.

Figure 2:
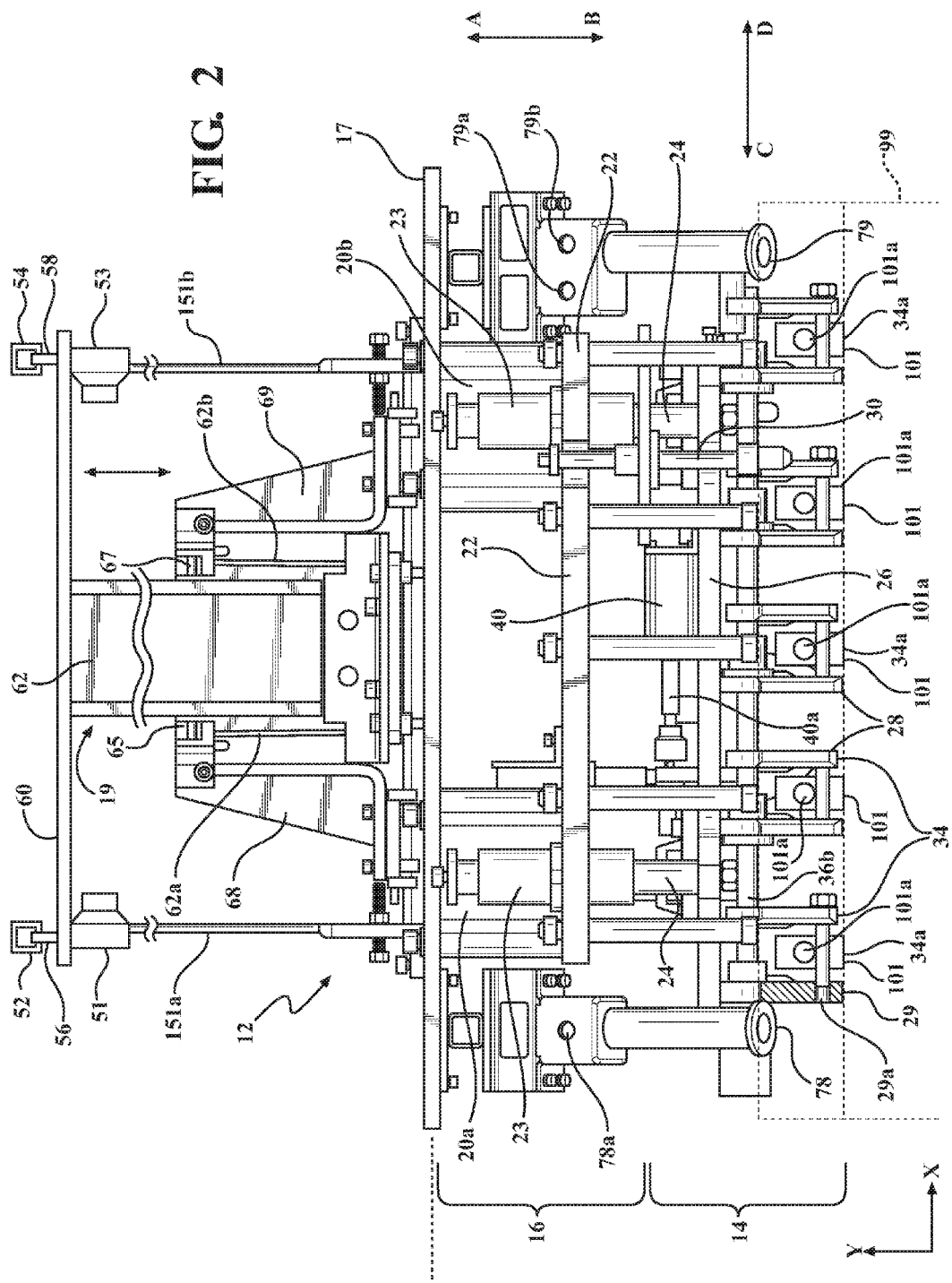
FIG. 2 is the frontal view of FIG. 1A showing the mechanism after operation of the mechanism to secure the engine block bearing caps to the mechanism prior to removal of the bearing caps from the engine block.
Figure 2A:
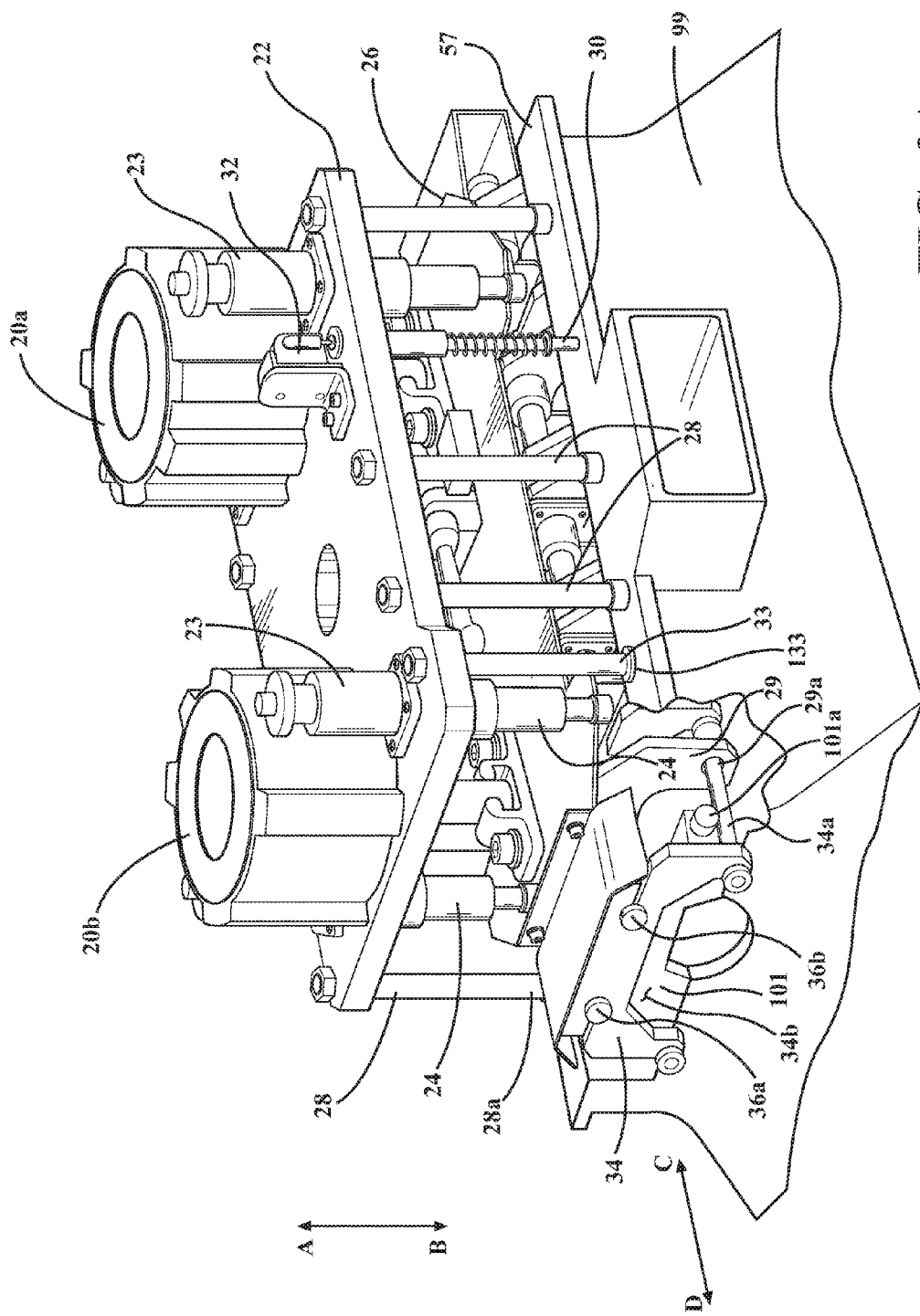
FIG. 2A is a partially cut-away rear perspective view of the embodiment shown in FIG. 2.
Figure 4:
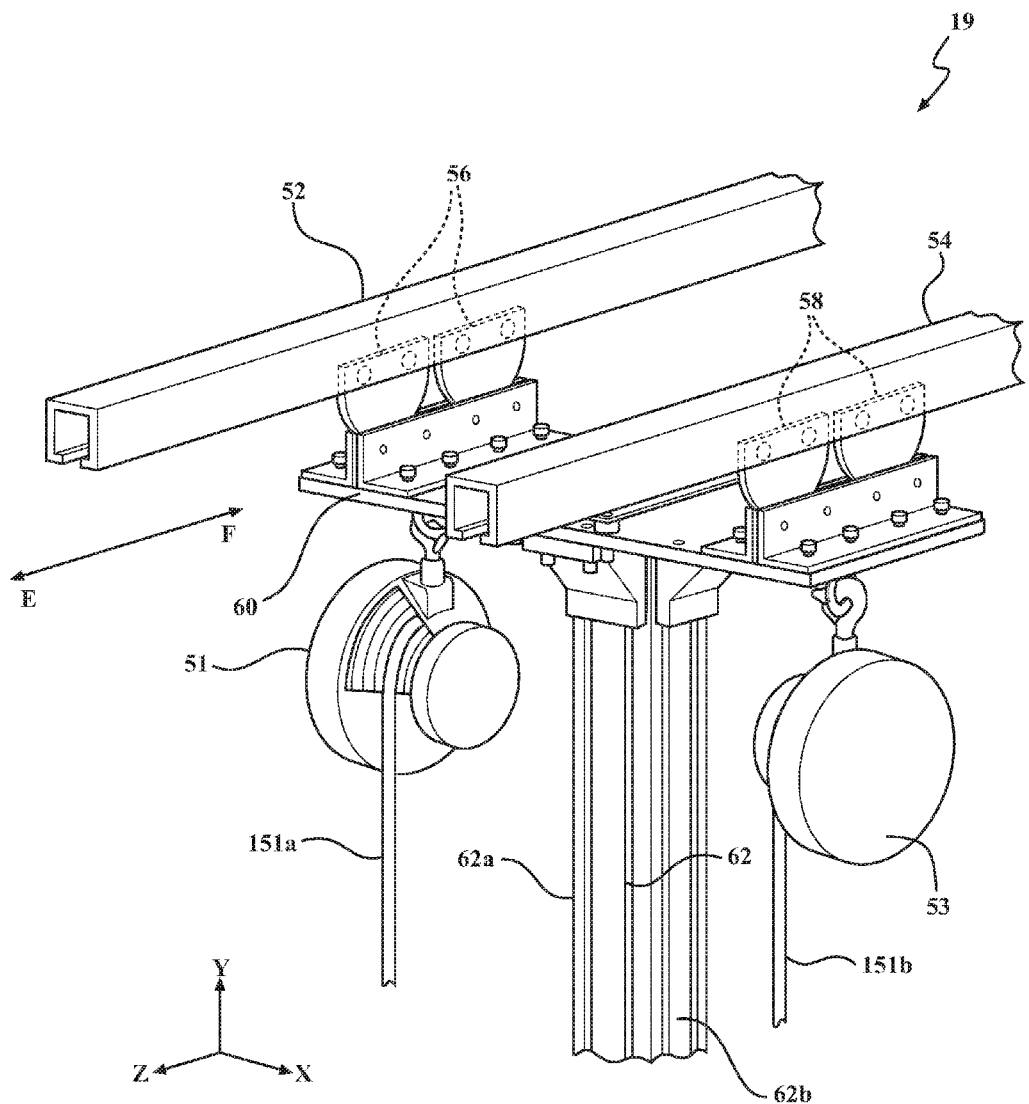
FIG. 4 is a schematic perspective view of a portion of a support mechanism in accordance with an embodiment described herein.

Referring to FIGS. 1 and 2A, a detection mechanism may be provided for determining when the cap removal mechanism 12 is positioned so as to enable engagement of the securement mechanism 14 to secure one or more bearing caps 101 to the cap removal mechanism 12. In one embodiment, the detection mechanism is in the form of a spring-loaded pin 30 extending through a hole formed in the guide mounting member 22. The pin 30 is movable within the hole in directions "A" and "B" (FIG. 1A). The detection mechanism 30 may be configured such that movement of the bearing cap removal mechanism 12 to a position on the engine block 99 in which the securement mechanism 14 may be operated to secure the bearing caps 101, also acts to move the spring-loaded pin 30 in direction "A". This movement of the pin 30 actuates a switch 32 designed to operate the securement member actuator 40 (described below) to move securement members 34 (described below) from retracted positions (shown in FIGS. 1 and 1A) to extended positions (shown in FIGS. 2 and 2A), thereby securing the one or more one bearing caps 101 to the bearing cap removal mechanism 12. The securement members 34 are in retracted positions when they are in positions (such as the positions shown in FIGS. 1 and 1A) which do not secure the bearing caps 101 to the securement mechanism 14. The securement members 34 are in extended positions when they are in positions (such as the positions shown in FIGS. 2, 2A, and 3) which secure the bearing caps 101 to the securement mechanism 14.

Referring to FIGS. 1 and 2A, a datum pin 33 may be attached to the guide mounting member 22 so as to extend in a direction generally toward the position in which an engine block would reside during operation of the mechanism to remove the bearing caps. The datum pin 33 may have a tapered end and may be positioned so as to be insertable into a complementary opening 133 in the engine block 99 when the cap removal mechanism 12 is properly positioned for activation of the securement mechanism 14.

Securement mechanism mounting member 26 is attached to ends of piston rods of cylinders 20a and 20b, so that the securement mechanism mounting member 26 is movable with respect to guide mounting member 22. The cylinders 20a and 20b are operable (by user actuation of the mechanism controls) to control the position of securement mechanism mounting member 26 with respect to guide mounting member 22 (i.e., to decrease and increase a distance between securement mechanism mounting member 26 and guide mounting member 22). Securement mechanism mounting member 26 is thus movable in directions "A" and "B" with respect to the guide mounting member 22, by operation of cylinders 20a and 20b. In one embodiment, the securement mechanism mounting member 26 is in the form of a flat plate configured for the purposes described herein.

The securement mechanism mounting member 26 has at least one securement member brace 29 mounted thereto so as to move with the securement mechanism mounting member 26. In the embodiment shown, a plurality of securement member braces 29 is mounted to the securement mechanism mounting member 26. Referring to the drawings, each securement member brace 29 is structured and positioned to support an associated securement member 34 when the securement member is in an extended position securing an associated bearing cap to the bearing cap removal mechanism 12. Brace(s) 29 may aid in distributing the cap removal forces applied to the cap, thereby helping to ensure that the removal force acts predominantly in direction "A". This aids in preventing damage to the cap and/or the engine block, and also aids in minimizing the force required to remove the cap from the block.

In the embodiment shown in the drawings, each brace 29 is in the form of a bracket with a pair of holes 29a formed therein, and a slide bushing 29b positioned in each hole. Each hole 29a is positioned coaxially with an associated one of securement member pins 34a. Each slide bushing 29b is structured to receive therein a pin 34a secured to an associated securement member 34. In this manner, each brace 29 supports two securement member pins 34a extending from an associated securement member 34 positioned opposite the brace.

Referring to the drawings, at least one securement member 34 is operatively coupled to the securement mechanism mounting member 26 so as to be movable with respect to an associated securement member brace 29. In the embodiment shown, a plurality of securement members 34 is coupled to the securement mechanism mounting member 26. Each securement member 34 is movable with respect to an associated securement member brace 29 positioned opposite the securement member. Each securement member 34 is movable between an extended position (shown in FIGS. 2 and 3) in which the bearing cap is secured to the securement mechanism 14, and a retracted position (shown in FIGS. 1 and 1A) in which the bearing cap is not secured to the securement mechanism 14.

In the embodiment shown, the securement members 34 are fixedly mounted on a pair of shafts 36a and 36b movably coupled to the securement mechanism mounting member 26. Shafts 36a and 36b may be slidably or otherwise movably coupled to securement mechanism mounting member 26 using bearings, bushings, or any other suitable method which enables the shafts 36a and 36b to reciprocate in directions "C" and "D" (FIG. 1A) as described herein.

In the embodiment shown, each securement member 34 includes a bracket 34b and a pair of pins 34a secured in and extending from holes formed in the bracket 34b. Securement members 34 and securement member braces 29 are aligned with each other so that each of pins 34a aligns with an associated one of securement member brace holes 29a and securement member brace slide bushings 29b. In addition, securement members 34 are positioned so that each pin 34a passes under an associated shoulder 101a of a bearing cap 101 (as seen in FIGS. 2, 2A, and 3), so that movement of the ends of pins 34a into slide bushings 29b of associated securement member braces 29 will locate the pins 34a under the shoulders 101a, thereby securing the bearing cap 101 to the securement mechanism 14. Also, the securement members 34 and the securement member braces 29 are arranged such that the pins 34a are spaced apart from an associated securement member brace 29 a distance "G" as shown in FIG. 1A when the securement members 34 are in their retracted positions. The distance "G" is specified so as to enable a shoulder 101a of a bearing cap 101 to fit between the end of the pin 34a and an associated brace 29 (with clearance) when the securement mechanism 14 is lowered onto the engine block 99.

A securement member actuator 40 is coupled to the securement mechanism mounting member 26. The shafts 36a and 36b are operatively coupled to the securement member actuator 40. While the removal force application mechanism 16 is structured to apply (via cylinders 20a and 20b) a removal force in a first direction (direction "A" shown in FIG. 1A) to the securement mechanism 14, elements of the securement mechanism 14 structured to secure the bearing caps 101 to the securement mechanism 14 may be structured to be movable in directions perpendicular to the first direction. Securement member actuator 40 operates to move the shafts 36a and 36b and the securement members 34 attached thereto in lateral directions "C" and "D", which are perpendicular to a line defined by directions "A" and "B" as shown in FIG. 1A.

In the embodiment shown, securement member actuator 40 is in the form of a cylinder (such as a pneumatic cylinder) which has a piston rod 40a oriented so as to reciprocate in directions "C" and "D" as shown. The piston rod 40a is coupled to the shafts 36a and 36b (for example, by a coupler plate or similar mechanism) so that the shafts 36a and 36b and the securement members 34 attached thereto reciprocate along with the piston rod 40a. As the shafts 36a and 36b move in directions "C" and "D", the shafts are structured to slide within the slide bushings 29a positioned in each of securement member braces 29. Thus, as shafts 36a and 36b and the attached securement members 34 move in directions "C" and "D" with respect to the relatively stationary securement member braces 29 mounted to the securement mechanism mounting member 26, the securement members 34 are moved between their retracted positions (FIGS. 1 and 1A) and their extended positions (FIGS. 2 and 2A).

Referring to FIGS. 1A, 2, 3 and 4, the suspended member 17 and the portions of the cap removal mechanism just described may be supported or suspended from a location above these portions of the cap removal mechanism 12, so that the suspended member 17 and the removal force application mechanism 16 and securement mechanism 14 attached thereto may be manipulated and positioned by an operator as needed. A support mechanism (generally designated 19) may be coupled to the suspended member 17 for supporting the suspended member 17, the removal force application mechanism 16, and the securement mechanism 14.

The support mechanism 19 may include at least one guide track positioned above the suspended member 17, and at least one roller structured for rolling along the guide track. In the embodiment shown, a pair of spaced-apart guide tracks 52 and 54 is provided. Associated rollers or wheels 56 are structured to roll along track 52, and associated rollers or wheels 58 are structured to roll along track 54. A support member 60 is coupled to rollers 56 and 58 and extends between guide tracks 52 and 54. A suspension member 62 is coupled at a first end thereof to the support member 60, and at a second end thereof to the suspended member 17. Thus, by suspension member 62, the securement mechanism 14 and the removal force application mechanism 16 are supported from a location above the securement mechanism 14 and the removal force application mechanism 16. This arrangement enables and facilitates movement of the securement mechanism 14 and the removal force application mechanism 16 in directions "E" and "F" (i.e., in directions backward and forward with respect to an operator facing an engine block from which bearing caps 101 are to be removed. By this means, the operator (not shown) may move the bearing cap removal mechanism 12 toward or away from a desired position overlying an engine block 99. In one embodiment, the suspension member 62 comprises an extruded aluminum tube. In addition, the suspension member 62 may include a first guide rail 62a extending along a first side of the suspension member, and a second guide rail 62b extending along a second side of the suspension member 62 opposite the first side.

A first bearing 65 (FIG. 2) may be movably coupled to the first guide rail 62a and a second bearing 67 may be movably coupled to the second guide rail 62b. A first guide bracket 68 may be coupled to the first bearing 65 and a second guide bracket 69 may be coupled to the second bearing 67. The guide brackets 68 and 69 may be coupled to the suspended member 17 so as to enable movement of the suspended member (and the attached securement mechanism 14 and removal force application mechanism 16) along the first and second guide rails 62a and 62b of the suspension member 62. In this manner, the elevation of the securement mechanism 14 and removal force application mechanism 16 may be adjusted in directions "A" and "B".

Also, in the embodiment shown, at least one cable balancer may be provided connecting the support member 60 to the suspended member 17, so as to partially support the combined weight of the suspended member 17, the removal force application mechanism 16, the securement mechanism 14, and other portions of the mechanism 12 attached to the suspended member 17. In the embodiment shown, a pair of spaced-apart cable balancers 51 and 53 is provided connecting the support member 60 to the suspended member 17. This arrangement also facilitates movement of the securement mechanism 14 and removal force application mechanism 16 in directions "A" and "B" (i.e., "up" and "down") by an operator.

Actuation of the various moving portions of the bearing cap removal mechanism 12 may be controlled using any suitable method. In one embodiment, known two-hand controls may be employed, in which it is necessary for an operator to use both hands to push separate, spaced-apart buttons simultaneously in order for parts of the mechanism 12 to actuate and move. This aids in preventing injury to the operator.

For example, in the embodiment shown, a pair of control handles 78 and 79 may be attached to the suspended member 17 to enable manipulation of the mechanism 12 by an operator. Handles 78 and 79 may have associated actuator buttons 78a, 79a, and 79b mounted thereon for actuating various portions of the mechanism 12 when the buttons are pushed. Referring to FIG. 1A, pushing of a button 78a enables operation of the mechanism when another one of buttons 79a and 79b are pushed simultaneously with button 78a. Button 79a may control the securement mechanism 14 to move the securement members 34 to extended positions. Button 79b may control the securement mechanism 14 to move the securement members 34 to retracted positions. Thus, simultaneous pressing of buttons 78a and 79a may result in movement of the securement members 34 to extended positions, and simultaneous pressing of buttons 78a and 79b may result in movement of the securement members 34 to retracted positions.

Referring to FIGS. 1A, 2, 2A and 3, in operation of the bearing cap removal mechanism 12, with an engine block 99 in place below the mechanism 12, an operator grabs both handles 78 and 79 and lowers the mechanism 12 onto the engine block 99. The tapered datum pin 33 enters an associated datum hole 133 in engine block 99 when the mechanism 12 is properly positioned on the engine block. The tapered datum pin 33 helps align the mechanism 12 with the engine block 99 for operation of the securement members 34. At this time, the securement members 34 are positioned in the retracted conditions shown in FIGS. 1 and 1A. As the mechanism 12 is lowered onto the engine block 99, bearing cap shoulders 101a pass through gaps between the securement members 34 and their associated securement member braces 29.

When the mechanism 12 is properly positioned on the engine block 99, the operator simultaneously presses control buttons 78a on handle 78 and 79a on handle 79. If the mechanism 12 is positioned properly, simultaneous pushing of these buttons, in combination with actuation of the switch 32 triggered by movement of the detection mechanism 30, will cause actuation of a pneumatic valve (not shown) to operate the securement member actuator 40. This causes the shafts 36a and 36b and the securement members 34 attached thereto to move in direction "C", thereby moving securement member pins 34a under the bearing cap shoulders 101a and into slide bushings 29b of associated securement member braces 29, thus securing the bearing caps 101 to the securement mechanism 14 as shown in FIGS. 2 and 2A. Positioning of the ends of securement member pins 34a within slide bushings 29b also aids in preventing the pins from bending or deforming due to repeated loading.

Also, referring to FIG. 2, full extension of the piston rod 40a of securement member actuator 40 so as extend the securement member pins 34a to secure the bearing caps 101 also causes a bracket 201 attached to the piston rod 40a to engage a limit switch 200. The bearing cap removal mechanism is configured so that engagement of the limit switch 200 causes the pistons of cylinders 20a and 20b to retract (i.e., to move in direction "A"). This causes securement mechanism mounting member 26 and the remainder of the securement mechanism 14 mounted thereto to move in direction "A", thereby pulling the bearing caps 101 from the engine block 99 as shown in FIG. 3. Then, while still simultaneously pressing both of buttons 78a and 79a, the operator may step backward, guiding the bearing cap removal mechanism 12 to a location over a stand or bin (not shown) where the bearing caps 101 are to be received when released from the mechanism 12. The operator may then release both buttons and lower the mechanism 12 until it is in contact with the stand.

Placing the mechanism 12 in contact with the stand will cause the detection mechanism 30 to move in direction "A". This movement of the detection mechanism operates the switch 32 as previously described. Once contact is made between the mechanism and the stand, the operator may press both buttons 78a and 79b at the same time. Simultaneous pushing of these buttons, in combination with actuation of the switch 32 triggered by movement of the detection mechanism 30, will cause actuation of a pneumatic valve (not shown) to operate the securement member actuator 40. This causes the shafts 36a and 36b and the securement members 34 attached thereto to retract or move in direction "D" (to the positions shown in FIG. 1A). This releases the bearing caps 101 from the securement members 34 and leaves the caps 101 on the stand. The operator may then release both control buttons 78a and 79b. The mechanism 12 may then be automatically returned to a home position (not shown) by means of a third cable balancer (not shown) that gently pulls the mechanism 12 backwards (i.e., toward the operator).

The mechanism and method of operation just described acts to simultaneously remove multiple bearing caps from an engine block, and ensures that the removed caps remain captured until released into a predetermined receptacle or processing area. In addition, the mechanism enables the amount and direction of the cap removal force to be controlled with a high level of consistency, helping to reduce or minimize the risk of damage to the bearing caps and the engine block.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A bearing cap removal mechanism configured for removing bearing caps from an engine block, the cap removal mechanism comprising:

a securement mechanism operable to releasably secure at least one bearing cap to the securement mechanism prior to removal of the at least one bearing cap from the engine block, the securement mechanism including at least one securement member, at least one pin extending from the at least one securement member, and at least one securement member brace positioned opposite and spaced apart from the securement member, the at least one pin being positioned so as to extend under an associated portion of the at least one bearing cap when the at least one bearing cap is secured to the securement mechanism, the at least one securement member brace being configured to engage a portion of the at least one pin when the at least one bearing cap is secured to the securement mechanism; and a removal force application mechanism operatively coupled to the securement mechanism, the removal force application mechanism being operable to move the securement mechanism in a direction away from the engine block when the at least one bearing cap is secured to the securement mechanism, thereby removing the at least one bearing cap from the engine block.

2. The bearing cap removal mechanism of claim 1 wherein the removal force application mechanism is configured to apply a removal force to the securement mechanism in a first direction, and wherein a portion of the securement mechanism configured to secure the at least one bearing cap to the securement mechanism is configured to be movable in directions perpendicular to the first direction.

3. The bearing cap removal mechanism of claim 1 further comprising a support mechanism configured to support the removal force application mechanism and the securement mechanism for manipulation by an operator.

4. The bearing cap removal mechanism of claim 3 wherein the support mechanism is configured to enable an operator to move the bearing cap removal mechanism backward and forward with respect to an operator facing an engine block.

5. The bearing cap removal mechanism of claim 3 wherein the support mechanism comprises:
   at least one guide track positioned above the removal force application mechanism;
   at least one roller structured for rolling along the at least one guide track;
   a support member coupled to the at least one roller; and
   a suspension member coupled to the support member and to the removal force application mechanism.

6. The bearing cap removal mechanism of claim 5 wherein the support mechanism comprises a plurality of guide tracks positioned above the removal force application mechanism, and a plurality of rollers, each roller being structured for rolling along an associated guide track of the a plurality of guide tracks, and wherein the support member is coupled to the a plurality of rollers.

7. The bearing cap removal mechanism of claim 5 wherein the suspension member includes a first guide rail extending along a first side of the suspension member, a second guide rail extending along a second side of the suspension member opposite the first side, and wherein the support mechanism further comprises:
   a first bearing movably coupled to the first guide rail;
   a second bearing movably coupled to the second guide rail;
   a first guide bracket coupled to the first bearing; and
   a second guide bracket coupled to the second bearing.

8. The bearing cap removal mechanism of claim 7 further comprising a suspended member coupled to the removal force application mechanism, and wherein the suspended member is coupled to the first guide bracket and the second guide bracket so as to enable movement of the suspended member along the first and second guide rails.

9. The bearing cap removal mechanism of claim 8 further comprising at least one cable balancer connecting the support member to the suspended member, so as to partially support a combined weight of the removal force application mechanism and the securement mechanism.

10. The bearing cap removal mechanism of claim 9 further comprising a pair of cable balancers coupling the support member to the removal force application mechanism, so as to partially support a combined weight of the removal force application mechanism and the securement mechanism.

11. The bearing cap removal mechanism of claim 1, wherein the securement mechanism comprises:
   a securement mechanism mounting member;
   wherein the at least one securement member is operatively coupled to the securement mechanism mounting member; and
   the at least one securement member brace is mounted to the securement mechanism mounting member,
   the at least one securement member being operatively coupled to the securement mechanism mounting member so as to be movable with respect to the at least one securement member brace between an extended position of the at least one securement member in which the at least one securement member secures the at least one bearing cap to the securement mechanism, and a retracted position of the at least one securement member in which the at least one bearing cap is not secured to the securement mechanism.

12. The bearing cap removal mechanism of claim 11 further comprising a securement member actuator operatively coupled to the at least one securement member, for moving the at least one securement member with respect to the at least one securement member brace, between the extended position and the retracted position.

13. The bearing cap removal mechanism of claim 12 further comprising:
   a detection mechanism configured for determining when the bearing cap removal mechanism is positioned so as to enable operation of the securement mechanism to secure the associated bearing cap to the securement mechanism; and
   a switch operatively coupled to the detection mechanism for enabling operation of the securement member actuator to move the at least one securement member from the retracted position to the extended position, responsive to positioning of the bearing cap removal mechanism as determined by the detection mechanism.

14. The bearing cap removal mechanism of claim 12 wherein the securement member actuator comprises a pneumatic cylinder mounted on the securement mechanism mounting member.

15. The bearing cap removal mechanism of claim 11 wherein the securement mechanism comprises:
   a plurality of securement members operatively coupled to the securement mechanism mounting member; and
   a plurality of securement member braces mounted to the securement mechanism mounting member, each brace of the plurality of braces being configured and positioned to support a portion of an associated securement member of the plurality of securement members when the associated securement member is in an extended position securing an associated bearing cap to the securement mechanism,
   each securement member of the plurality of securement members being operatively coupled to the securement mechanism mounting member so as to be movable with respect to an associated brace of the plurality of braces, between the extended position of the securement member, and a retracted position of the securement member in which the associated bearing cap is not secured to the securement mechanism.

16. The bearing cap removal mechanism of claim 1 wherein the removal force application mechanism includes at least one cylinder having a piston shaft operatively coupled to the securement mechanism mounting member for applying a force to the securement mechanism mounting member.

17. The bearing cap removal mechanism of claim 1 further comprising a datum pin for locating the bearing cap removal mechanism with respect to the engine block.

18. The bearing cap removal mechanism of claim 1 wherein the securement mechanism includes a pair of pins extending from the at least one securement member and the at least one securement member brace comprises a bracket with a pair of spaced apart holes formed therein, each hole being configured for receiving therein an end portion of an associated one of the pins of the pair of pins.

19. The bearing cap removal mechanism of claim 18 wherein the at least one securement member and the at least one securement member brace are aligned with each other so that each pin of the pair of pins aligns with an associated one of the securement member brace holes prior to engagement between the pin and the associated one of the securement member brace holes.

20. The bearing cap removal mechanism of claim 1 wherein the at least one securement member is configured to be spaced apart from the at least one securement member brace prior to securement of the at least one bearing cap to the at least securement mechanism, so as to enable the associated portion of the at least one bearing cap to fit between an end of the at least one pin and the at least one securement member brace.

21. A bearing cap removal mechanism configured for removing bearing caps from an engine block, the cap removal mechanism comprising:
at least one linearly reciprocating movable member, wherein the movable member reciprocates linearly in a first direction and in a second direction opposite the first direction;
a bracket coupled to the at least one movable member so as to linearly reciprocate with the at least one movable member;
at least one pin coupled to the bracket so as to move with the bracket, the at least one pin being positionable below a portion of an associated bearing cap by movement of the bracket; and
a removal force application mechanism operatively coupled to the at least one movable member, the removal force application mechanism being operable to move the at least one movable member in a third direction away from the engine block and transverse to the first and second directions when the at least one pin is positioned below the portion of the associated bearing cap, thereby removing the at least one bearing cap from the engine block.

22. The bearing cap removal mechanism of claim 21 further comprising a support mechanism configured to support the removal force application mechanism and the at least one movable member for manipulation by an operator.

* * * * *